3,206,452
THIAZOLE AZO COMPOUNDS
James M. Straley and David J. Wallace, Kingsport, Tenn.,
  assignors to Eastman Kodak Company, Rochester, N.Y.,
  a corporation of New Jersey
No Drawing. Filed Jan. 7, 1963, Ser. No. 249,588
12 Claims. (Cl. 260—155)

This invention relates to novel compounds containing a dicarboximido radical, and more particularly to azo compounds, such as azo dyestuffs, containing a dicarboximido radical. Particular azo compounds containing this radical include compounds obtained by coupling diazotized 2-aminothiazoles with dicarboximidoalkyl tetrahydroquinoline coupling components.

These particular azo compounds have the general formula (I)
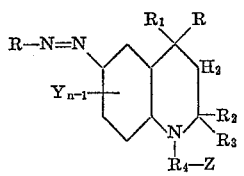

wherein
R = a monocyclic 2-thiazolyl radical, that is, a radical having the formula

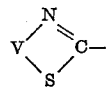

in which V is a vinylene group, including substituted and unsubstituted vinylene, mono- and di-substituted vinylene groups, such as

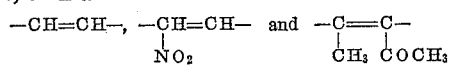

as present in 2-aminothiazole and the substituted 2-aminothiazoles described in the examples below; the nitro, alkylsulfonyl, alkyl, and cyano substituted 2-aminothiazoles being particularly efficacious for use in making the azo compounds;

$R_1$, $R_2$ and $R_3$ each equal a hydrogen atom or a lower alkyl group, particularly methyl;

$Y_{n-1}$ = the substituents in at least one of the 5-, 7- or 8-positions of the tetrahydroquinoline nucleus wherein Y is either a lower alkyl group, particularly methyl; a lower alkoxy group, particularly methoxy; or a halogen atom, including a chlorine atom or a bromine atom;

$n$ = a positive integer from 1 to 4;

$R_4$ = an alkylene group straight or branch-chained, particularly lower alkylene, such as —$(CH_2)_{n'}$— wherein $n'$ is a positive integer from 1 to 4, Z = a dicarboximido radical such as phthalimido, succinimido, maleimido, citraconimido, etc., as indicated in the examples below, derived from the corresponding anhydride.

The 2-aminothiazoles which are diazotized and coupled with the mentioned coupling components are, for example, 2-aminothiazole, 2-amino-5-nitrothiazole, 2-amino-5-alkylsulfonylthiazoles and other 2-aminothiazoles disclosed in the examples hereinafter.

The dicarboximidoalkyl tetrahydroquinoline coupling components of the invention which are coupled with the diazotized 2-aminothiazoles, have the following general formula (II)
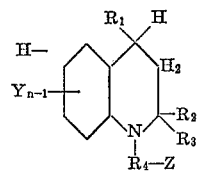

wherein $R_1$, $R_2$, $R_3$, $R_4$, Y, n and Z have the same meaning as given above.

The dicarboximido radical Z of the azo compounds and coupling components of Formulas I and II above, has the following general formula

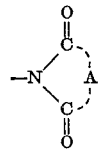

wherein "A" represents the atoms necessary to complete a ring containing 4 or 5 carbon atoms in addition to the nitrogen atom, i.e., the hydrocarbon residue of the dicarboxylic acid anhydride from which the radical is derived, including substituted and unsubstituted alkylene, vinylene and ortho-phenylene groups, such as the alkylene group —$CH_2CH_2$— in the succinimido radical

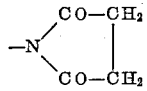

The dicarboximidoalkyl tetrahydroquinoline coupling components are obtained as described in the followinig typical reaction, by the condensation of a dicarboxylic acid anhydride with an N-aminoalkyltetrahydroquinoline

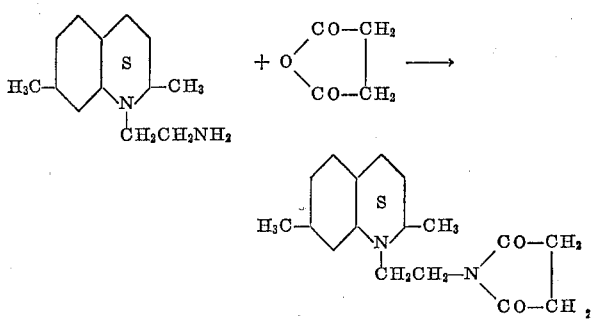

Representative 5- and 6-membered cyclic dicarboximidoalkyl tetrahydroquinoline couplers referred to in the examples below, useful for preparing the azo compounds are:

N-β-succinimidoethyl-1,2,3,4-tetrahydroquinoline
N-succinimidomethyl-1,2,3,4-tetrahydroquinoline
N-β-succinimidoethyl-2,7-dimethyl-1,2,3,4-tetrahydroquinoline N-β-phthalimidoethyl-1,2,3,4-tetrahydroquinoline
N-β-succinimidoethyl-2,2,4,-tetramethyl-1,2,3,4-tetrahydroquinoline
N-α-succinimidopropyl-2,7-dimethyl-1,2,3,4-tetrahydro
N-β-succinimidoethyl-2,2,4-trimethyl-1,2,3,4-tetrahydroquinoline
N-β-succinimidoethyl-2-methyl-1,2,3,4-tetrahydroquinoline
N-β-succinimidoethyl-2-isopropyl-7-methoxy-1,2,3,4-tetrahydroquinoline The azo compounds can be used for dyeing textile materials including synthetic polymer fibers, yarns and fabrics giving fast blue to violet shades when applied by conventional dyeing methods to cellulose ester and polyester fibers. The azo compounds have moderate affinity for polyamide fibers and possess the valuable property of staining wool less than do previous thiazole azo dyes. When the azo compounds are used for dyeing such hydrophobic materials, they should be free of water-solubilizing groups such as sulfo and carboxyl groups. In general, the dyes have good fastness, for example, to light, washing, gas (atmospheric fumes) and sublimation. The dyes are useful in application and discharge printing.

The following examples will serve to illustrate the preparation of representative intermediates and azo compounds of our invention.

EXAMPLE 1

*N-β-succinimidoethyl-2,7-dimethyl-1,2,3,4-tetrahydroquinoline*

20.4 g. (0.1 m.) N-2-aminoethyl-2,7-dimethyl-1,2,3,4-tetrahydroquinoline, 10.0 g. (0.1 m.) succinic anhydride, and 1 g. sulfanilic acid are heated at 140–150° C. for 1 hour. The reaction mixture is poured into 300 ml. of ethanol and this suspension is heated to solution. On cooling, a solid results. Yield—18.3 g., M.P. 142–145° C. Recrystallized from ethanol the products melts at 146–147° C. The course of the reaction of this example is provided in the above description.

EXAMPLE 2

*N-β-succinimidoethyl-1,2,3,4-tetrahydroquinoline*

17.6 g. (0.1 m.) N-2-aminoethyl-1,2,3,4-tetrahydroquinoline and 10.0 g. (0.1 m.) succinic anhydride are heated together at 135–140° C. for 1 hour. This mixture is poured while hot into 200 ml. of ethanol. On cooling, the product crystallizes. Yield, 14.8 g., M.P. 111–113° C.

The other dicarboximidoalkyl tetrahydroquinoline couplers can be prepared by the method of Examples 1 and 2 by reaction of the appropriate anhydride with the appropriate N-aminoalkyltetrahydroquinoline.

EXAMPLE 3

*Preparation of azo compound*

(a) *Diazotization.*—1.45 g. (0.01 m.) 2-amino-5-nitrothiazole is stirred in 30 ml. of water, and 16 ml. conc. sulfuric acid is added, causing immediate solution. The solution is cooled to −10° C. and a solution of 0.72 g. (0.0104 m.) sodium nitrite in 8 ml. conc. sulfuric acid is added portionwise below −5° C. The mixture is stirred 2 hours at −10° to −5° C.

(b) *Coupling.*—2.86 g. (0.01 m.) N-β-succinimidoethyl-2,7-dimethyl-1,2,3,4-tetrahydroquinoline is dissolved in 50 ml. of 15% aqueous sulfuric acid, and the solution cools in an ice-bath. The diazonium solution from (a) above is added, the reaction mixture allowed to stand 2 hours in the ice-bath, then drowned with water. The dye is filtered off, washed with water, and dried. The product dyes cellulose acetate desirable blue shades with good fastness properties. The azo compound has the formula

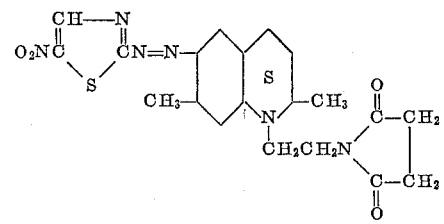

EXAMPLE 4

The procedure of Example 3 is carried out except that the coupler used is 3.06 g. of N-β-phthalimidoethyl-1,2,3,4-tetrahydroquinoline. The yield is 3.5 g. of product which imparts bright blue shades to cellulose acetate fabric.

EXAMPLE 5

The procedure of Example 3 is carried out except that the diazo component is 1.68 g. of 2-amino-4-trifluoromethylthiazole. The yield is 3.25 g. of product which dyes cellulose acetate and polyester fabrics in violet shades.

EXAMPLE 6

The procedure of Example 3 is carried out except that the diazo component used is 1.26 g. of 2-amino-4-methylthiazole. The product dyes cellulose acetate fabrics in violet shades.

EXAMPLE 7

The procedure of Example 3 is carried out except that the diazo component used is 2.21 g. 2-amino-5-butylsulfonylthiazole. The product dyes cellulose esters and polyester fibers in blue shades.

EXAMPLE 8

The procedure of Example 3 is carried out except that the coupler is 3.1 g. of N-β-succinimidoethyl-2,2,4,7-tetramethyl-1,2,3,4-tetrahydroquinoline. The product dyes cellulose acetate and polyester fabrics in bright blue shades.

EXAMPLE 9

The procedure of Example 3 is carried out except that the coupler used is 3 g. of N-α-succinimidopropyl-2,7-dimethyl-1,2,3,4-tetrahydroquinoline. The product produces bright blue shades on cellulose acetate and polyester fibers.

EXAMPLE 10

The procedure of Example 3 is carried out except that the coupler used is 3 g. of N-β-succinimidoethyl-2,2,4-trimethyl-1,2,3,4-tetrahydroquinoline. The product dyes cellulose acetate fibers blue shades.

The azo compounds described in the following table are prepared in the manner of the above examples using the indicated diazotized 2-aminothiazoles and dicarboximidoalkyltetrahydroquinoline couplers. $Y_{n-1}$, $R_2$, $R_4$ and $Z$ refer to the general formulas above wherein $R_1$ and $R_3$ are hydrogen atoms. Thus, the azo compound of Example 3, included in the table for illustration, is prepared from 2-amino-5-nitrothiazole and N-β-succinimidoethyl-2,7-dimethyl-1,2,3,4-tetrahydroquinoline as described in detail in Example 3 above. In the table, the color of the dyeings refers to the color obtainable by dyeing a cellulose acetate fabric with the azo compound.

*Dicarboximidoalkyltetrahydroquinoline Coupler*

| Example No. | 2-Aminothiazole Diazotized | $Y_{n-1}$ | $R_4$ | $R_2$ | Z | Color of Dyeings |
|---|---|---|---|---|---|---|
| 3 | 5-NO$_2$ | 7-CH$_3$ | —CH$_2$CH$_2$— | 2-CH$_3$ | Succinimido | Blue. |
| 4 | 5-NO$_2$ | H | —CH$_2$CH$_2$— | 2-CH$_3$ | ----do---- | Do. |
| 5 | 5-NO$_2$ | 7-CH$_3$ | —CH$_2$CH$_2$— | 2-CH$_3$ | Phthalimido | Do. |
| 6 | 5-NO$_2$ | 7-CH$_3$ | —CH$_2$CH$_2$— | 2-CH$_3$ | Maleimido | Do. |
| 7 | 5-NO$_2$ | 7-CH$_3$ | —CH$_2$CH$_2$— | 2-CH$_3$ | Citraconimido | Do. |
| 8 | 5-NO$_2$ | 7-CH$_3$ | —CH$_2$CH$_2$— | 2-CH$_3$ | Hexahydrophthalimido | Do. |
| 9 | 5-NO$_2$ | 7-CH$_3$ | —CH$_2$CH$_2$— | 2-CH$_3$ | Tetrahydrophthalimido | Do. |
| 10 | 5-NO$_2$ | 7-CH$_3$ | —CH$_2$CH$_2$— | 2-CH$_3$ | 3-nitrophthalimido | Do. |
| 11 | 5-NO$_2$ | 7-CH$_3$ | —CH$_2$CH$_2$— | 2-CH$_3$ | Chlorotetrahydrophthalimido. | Do. |
| 12 | 5-NO$_2$ | 7-CH$_3$ | —ĊHCH$_2$CH$_2$— (CH$_3$) | 2-CH$_3$ | Succinimido | Do. |
| 13 | 5-NO$_2$ | 7-CH$_3$ | —CH$_2$CH$_2$— | 2-isopropyl | ----do---- | Do. |
| 14 | 5-NO$_2$ | 7-CH$_3$ | —CH$_2$CH$_2$— | 2-CH$_3$ | ----do---- | Do. |
| 15 | 5-NO$_2$ | 7-OCH$_3$ | —CH$_2$CH$_2$— | 2-isopropyl | ----do---- | Do. |
| 16 | 5-NO$_2$ | 7-Cl | —CH$_2$CH$_2$— | ----do---- | ----do---- | Do. |
| 17 | 5-NO$_2$ | 5,8-dimethyl | —CH$_2$CH$_2$— | ----do---- | ----do---- | Do. |
| 18 | 4-CO$_2$C$_2$H$_5$ | 7-CH$_3$ | —CH$_2$CH$_2$— | 2-CH$_3$ | ----do---- | Do. |
| 19 | 4-NHCOCH$_3$ | 7-CH$_3$ | —CH$_2$CH$_2$— | 2-CH$_3$ | ----do---- | Violet. |
| 20 | None | 7-CH$_3$ | —CH$_2$CH$_2$— | 2-CH$_3$ | ----do---- | Blue. |
| 21 | 4-CH$_3$, 5-COCH$_3$ | 7-CH$_3$ | —CH$_2$CH$_2$— | 2-CH$_3$ | ----do---- | Violet. |
| 22 | 5-CN | 7-CH$_3$ | —CH$_2$CH$_2$— | 2-CH$_3$ | ----do---- | Blue. |
| 23 | 5-SCN | 7-CH$_3$ | —CH$_2$CH$_2$— | 2-CH$_3$ | ----do---- | Violet. |
| 24 | 5-Br | 7-CH$_3$ | —CH$_2$CH$_2$— | 2-CH$_3$ | ----do---- | Do. |
| 25 | 4-phenyl | 7-CH$_3$ | —CH$_2$CH$_2$— | 2-CH$_3$ | ----do---- | Do. |
| 26 | 5-NO$_2$ | 7-CH$_3$ | —CH$_2$— | 2-CH$_3$ | Glutarimido | Blue. |

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 3,043,827.

Since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

Cellulose esters which can be dyed with the azo compounds include cellulose aliphatic carboxylic acid esters having 2 to 4 carbon atoms in the acid groups thereof, by which we mean to include, for example, both partially hydrolyzed and unhydrolyzed cellulose acetate, cellulose propionate and cellulose acetatebutyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber yarn and fabric form, is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. Azo compounds having the general formula

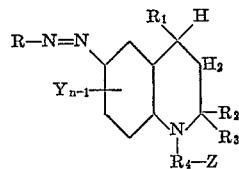

wherein
R = a monocyclic-2-thiazolyl radical,
$R_1$, $R_2$ and $R_3$ each = a member of the class consisting of a hydrogen atom and a lower alkyl group,
$R_4$ = lower alkylene,
Y = a member of the class consisting of a lower alkyl group, a lower alkoxy group, chlorine and bromine,
n = a positive integer from 1 to 4, and
Z = a dicarboximido radical.

2. Azo compounds according to claim 1 wherein $R_4$ is an ethylene group.

3. Azo compounds according to claim 1 wherein R is a 5-nitro-2-thiazolyl radical.

4. Azo compounds according to claim 1 wherein
R = a monocyclic 2-thiazolyl radical,
$R_4$ = a lower alkylene group,
Z = a succinimido radical and at least one of $R_1$, $R_2$, $R_3$ and $Y_{n-1}$ is a methyl group and the remainder are hydrogen atoms.

5. Azo compounds according to claim 1 wherein
R = a monocyclic 2-thiazolyl radical,
$R_4$ = —CH$_2$CH$_2$—,
Z = a succinimido radical and at least one of $R_1$, $R_2$, $R_3$ and $Y_{n-1}$ is a methyl group and the remainder are hydrogen atoms.

6. Azo compounds according to claim 1 wherein
R = a monocyclic 2-thiazolyl radical,
$R_4$ = a lower alkylene group,
Z = a phthalimido radical and at least one of $R_1$, $R_2$, $R_3$ and $Y_{n-1}$ is a methyl group and the remainder are hydrogen atoms.

7. Azo compounds according to claim 1 wherein
R = a monocyclic 2-thiazolyl radical,
$R_4$ = —CH$_2$CH$_2$—,
Z = a phthalimido radical and at least one of $R_1$, $R_2$, $R_3$ and $Y_{n-1}$ is a methyl group and the remainder are hydrogen atoms.

8. The compound
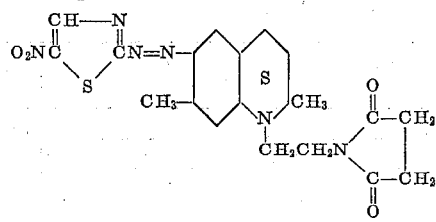
9. The compound
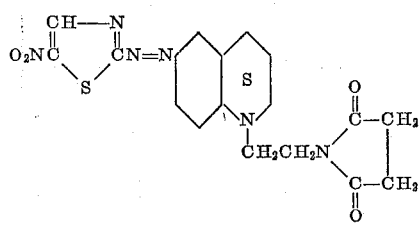
10. The compound
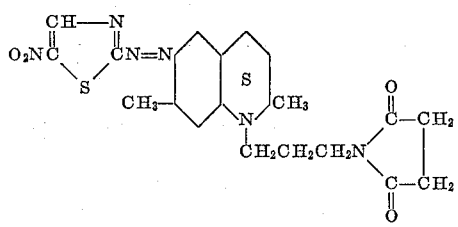
11. The compound
12. The compound
References Cited by the Examiner
UNITED STATES PATENTS
| | | | |
|---|---|---|---|
| 2,283,211 | 5/52 | Jones et al. | 260—155 |
| 2,714,594 | 8/55 | Cusic | 260—287 |
| 2,839,523 | 6/58 | Towne et al. | 260—158 |
| 2,955,901 | 10/60 | Kruckenberg | 8—41 |
| 2,972,507 | 2/61 | Kruckenberg et al. | 8—41 |
| 3,037,984 | 6/62 | Biel | 260—287 |
CHARLES B. PARKER, *Primary Examiner.*

UNITED STATES PATENT OFFICE
CERTIFICATE OF CORRECTION

Patent No. 3,206,452                                September 14, 1965

James M. Straley et al.

It is hereby certified that error appears in the above numbered patent requiring correction and that the said Letters Patent should read as corrected below.

Column 7, the formula in claim 8 should appear as shown below instead of as in the patent:

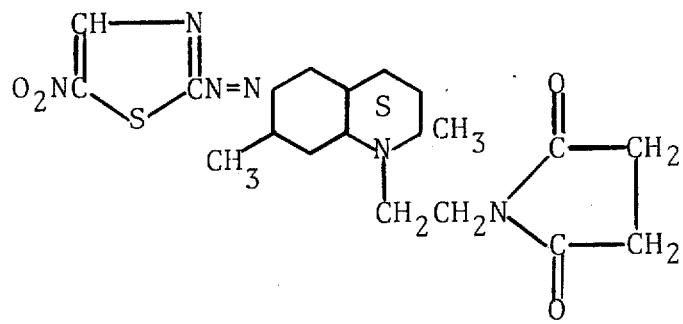

column 8, the formula in claim 11 should appear as shown below instead of as in the patent:

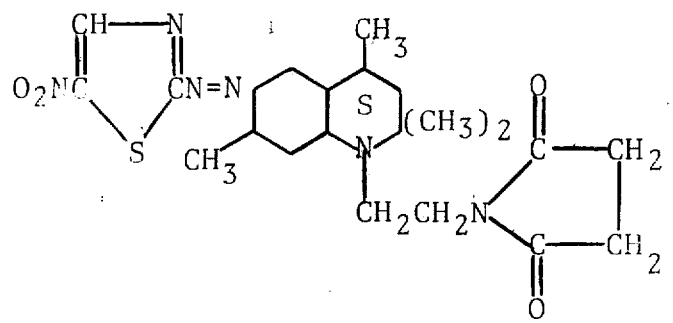

Signed and sealed this 10th day of May 1966.

(SEAL)
Attest:

ERNEST W. SWIDER             EDWARD J. BRENNER
Attesting Officer            Commissioner of Patents